J. W. BROCKWAY.
LUBRICATOR FOR LOOSE PULLEY.

No. 102,215. Patented Apr. 26, 1870.

United States Patent Office.

JOSEPH W. BROCKWAY, OF NEW YORK, N. Y.

Letters Patent No. 102,215, dated April 26, 1870.

IMPROVED LUBRICATOR FOR LOOSE PULLEYS.

The Schedule referred to in these Letters Patent and making part of the same.

*To all whom it may concern:*

Be it known that I, JOSEPH W. BROCKWAY, of the city and State of New York, have invented and made a new and useful Improvement in Lubricating Loose Pulleys, and the following is declared to be a correct description thereof.

Difficulties have heretofore arisen in lubricating loose pulleys in machinery, because the oil-holder has generally revolved with the pulley; hence, the centrifugal action usually throws the oil away from the journal, either wasting the same or preventing it lubricating the journal; besides these difficulties, another arises from the fact that the loose pulley has to be stopped for lubrication; this cannot be done frequently while the machinery is in motion, because the friction causes the loose pulley to revolve with the contiguous fast pulley.

To obviate these difficulties, a device has been made use of in which an oil-holder is provided below the journal-box, from which the oil is drawn up by the revolution of the shaft and loose pulley.

The nature of my said invention consists in a tubular journal of the loose pulley, extending into the journal-box and surrounding the shaft, said tube being perforated for the passage of oil from the oil-holder upon the box to the shaft within the said tube; thereby the tube of the loose pulley becomes the journal-box of the shaft when the loose pulley is stationary, and said sleeve or tube becomes the journal of the loose pulley when the same is being revolved within the journal-box and upon the shaft, the oil being free to pass to either or both surfaces that may be in motion.

In the drawing—

The shaft $a$ carries the pulley $b$, firmly attached thereto.

$c$ is the loose pulley, with a tubular journal, $d$, surrounding the shaft $a$, and extending into the journal-box $e$, that is of any desired character or size, and may be upon a line shaft in the form of a hanger, or upon other mechanism.

Figure 1:
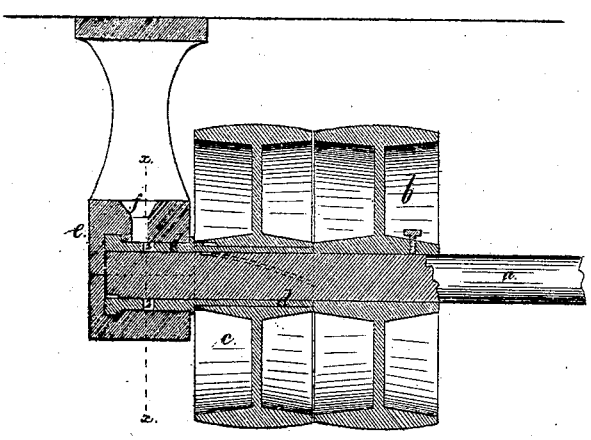
Figure 1 is a section, longitudinally, of the shaft.
Figure 2:
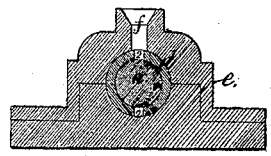
Figure 2 is a section at the line $x$ $x$, transversely of the journal and box.

The tube $d$ is perforated with one or more holes $h$, as seen most clearly in fig. 2, and the oil-holder or lubricator $f$ is provided upon the journal-box. This may be of any desired character.

It will be now understood that the tube $d$ and loose pulley $c$ revolve together upon the saft $a$, when that is stationary, and also within the box $e$, and the oil is free to lubricate the exterior of the tube $d$ within the box $e$, and the interior of this tube $d$ is lubricated through the holes $h$, and I prefer that there be a spiral groove in the shaft $a$ to act to cause the oil to move toward the loose pulley. So also when the shaft $a$ is revolved by the pulley $b$ the tube $d$ becomes its journal-box, within which the said shaft $a$ revolves.

This mode of construction obviates all the difficulties aforesaid, and enables me to lubricate all parts fully, and the tube $d$ may be formed with the loose pulley, or be a separate tube driven into the hub of said loose pulley, hence, this improvement can be applied to a loose pulley already made, by boring out the said pulley and the journal-box, and, in case of the parts becoming worn, the tube $d$ can be replaced.

I claim as my invention—

The tubular journal $d$, within the journal-box $e$, forming the bearing for the revolving shaft $a$, in combination with the pulley $b$ on the shaft $a$, the pulley $c$ on the tubular journal $d$, and the openings through said tubular journal $d$, for oil to pass to the revolving shaft $a$, as and for the purposes specified.

Signed this 23d day of February, A. D. 1870.

JOSEPH W. BROCKWAY.

Witnesses:
HAROLD SERRELL,
GEO. T. PINCKNEY.